(12) United States Patent
Marukawa et al.

(10) Patent No.: US 7,863,781 B2
(45) Date of Patent: Jan. 4, 2011

(54) POWER UNIT AND SAFETY CIRCUIT HAVING THE SAME

(75) Inventors: Shuhei Marukawa, Toyohashi (JP);
Yoshikazu Miyagi, Toyohashi (JP);
Yasushi Matsukawa, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 194 days.

(21) Appl. No.: 12/175,383

(22) Filed: Jul. 17, 2008

(65) Prior Publication Data
US 2009/0051226 A1    Feb. 26, 2009

(30) Foreign Application Priority Data
Aug. 24, 2007   (JP)   ............... 2007-217784

(51) Int. Cl.
*H02H 11/00*   (2006.01)
(52) U.S. Cl. .................................... 307/326
(58) Field of Classification Search .............. 307/326
See application file for complete search history.

(56) References Cited

U.S. PATENT DOCUMENTS 6,668,963 B2 * 12/2003 Nada ..................... 180/279

2002/0017405 A1   2/2002 Nada
2006/0228919 A1   10/2006 Marukawa

FOREIGN PATENT DOCUMENTS

JP   2001-320801 A   11/2001
JP   2006-294425 A   10/2006

* cited by examiner

*Primary Examiner*—Robert L. Deberadinis
(74) *Attorney, Agent, or Firm*—Christensen O'Connor Johnson Kindness PLLC

(57) ABSTRACT

A power unit including a plurality of series-connected battery modules and safety circuit wherein a service plug is inserted from the side of a terminal board of a battery pack, thereby establishing an electrical connection among battery modules. A connector is provided on a back of a terminal cover by way of a projecting section, and a second safety switch is activated by attachment of a terminal cover and insertion of the connector to the terminal board, thereby establishing an electrical connection among the battery modules. Even when the service plug is attached at the time of completion of maintenance without attachment of the terminal cover, the battery modules are still kept in an unconnected state by means of a second switch, and energization, which would otherwise arise with exposed terminals, is prevented.

4 Claims, 6 Drawing Sheets

POWER UNIT AND SAFETY CIRCUIT HAVING THE SAME

PRIORITY INFORMATION

This application claims priority to Japanese Patent Application No. 2007-217784 filed on Aug. 24, 2007, which is incorporated herein by reference in its entirety.

BACKGROUND OF THE INVENTION

1. Technical Field

The present invention relates to a power unit and a safety circuit having the same, and more particularly to a structure for preventing an electric shock, which would otherwise arise during maintenance operation 2. Related Art In a hybrid electric vehicle, or the like, using a power unit assembled by a series connection of a plurality of battery modules, each of which consists of one cell or a plurality of cells, provision of only a power switch for opening or closing a current-carrying circuit originating from a power unit is assumed not to prevent erroneous activation of a power switch during maintenance operation. For this reason, provision of an interlock mechanism separate from the power switch has been proposed.

2001-320801 A describes a configuration having a safety switch interposed between an arbitrary pair of battery modules in which an operator inserts and removes a service plug into and from the breaker main unit, thereby opening or closing a connection among battery modules and consequently opening and closing the current-carrying circuit. There is also described a configuration in which an interlock lead switch is turned off as a result of removal of the service plug, thereby deactivating a system main relay in a master control section.

2006-294425 A describes a configuration having a safety switch interposed between an arbitrary pair of battery modules in which an operator inserts and removes a safety plug into and from the breaker main unit, thereby opening or closing a connection among the battery modules, as well as describing provision of a key for hindering insertion of the safety plug in a state of being attachable and attached to the breaker main unit.

FIGS. 6, 7A, and 7B show the configuration of a related-art battery pack. A battery pack 1 is for driving a vehicle. A plurality of battery modules made up of one cell or a plurality of series-connected cells are arranged in parallel with cooling passages interposed therebetween. The battery pack includes a built-in battery assembly constructed by binding and assembling end members disposed at both ends of the battery modules and connecting the battery modules in series with each other. A cooling air ventilation passage for supplying and exhausting a cooling air to and from the respective cooling passages provided between the battery modules is laid in upper and lower portions of the battery assembly. A charge/discharge monitoring section (a battery ECU) where equipment for monitoring a voltage, a current, a temperature, an SOC (State of Charge), and the like, of a battery pack is provided on one side surface of the battery assembly, and a fan for supplying a cooling air to the cooling air ventilation passage is provided on the other end of the battery assembly.

A safety switch 2 for opening and closing a current-carrying circuit among arbitrary interconnected battery modules is provided in a middle position on one side surface of the battery pack 1. The safety switch 2 is made up of a switch main body 3 and a safety plug 4 and configured in such a way that the current-carrying circuit is closed by insertion of the safety plug 4 and that the current-carrying circuit is opened by removal of the safety plug 4.

FIGS. 7A and 7B show an electrical connection configuration of the battery pack 1. Mutually-adjoining battery modules 5 are wholly connected in series as a result of positive terminals and negative terminals of the battery modules 5 are sequentially connected to each other. All of the positive and negative terminals connected to both ends of the respective battery modules are connected to external connection terminals 7 by way of a main relay switch 6. Further, the positive and negative terminals of a pair of arbitrary, adjacent, intermediate battery modules 5 are connected to each other by way of the safety switch 2. A pair of connection terminals 3a are connected in parallel within the switch main body 3 of the safety switch 2, and the positive and negative terminals of the pair of battery modules 5 are connected to the connection terminals 3a. A pair of connection terminals 4a are provided opposite the connection terminals 3a on an insertion-side end face of the safety plug 4 of the safety switch 2 as shown in FIG. 7B. A pair of connection terminals 4a are connected to each other by way of a fuse 8, and the connection terminals 3a are connected together by way of the fuse 8 by insertion of the safety plug 4 into the switch main body 3. The current-carrying circuit is shut off by removal of the safety plug 4. The safety plug 4 is provided with a lock member 9 that is appropriately operated in a state of being inserted into the switch main body 3, to thus engage an engagement section 9a in a counterpart engagement section 10 formed in the switch main body 3, thereby locking an inserted state. Further, the safety plug 4 is provided with a detection switch 11 that operates when the lock member 9 is brought into a locked state. When the detection switch 11 operates, the control section 12 is configured so as to close the main relay switch 6.

As mentioned above, safety can be ensured during maintenance operation by adoption of the interlock configuration that opens and closes a connection between the battery modules by insertion and removal of a service plug (or a safety plug). However, a problem may arise when a terminal cover is removed during operation for performing maintenance and check on the neighborhood of the positive and negative external connection terminals of the battery modules. Specifically, it may also be the case where maintenance and check performance will be performed after removal of the service plug and the terminal cover and where a serviceman will insert the service plug by forgetting to attach the terminal cover after completion of the maintenance and check operation. In this case, the connection between the battery modules will be closed while the external connection terminals are left exposed.

As a matter of course, there is also a conceivable case where the geometry of a position where the service plug and the terminal cover are engaged with each other is provided with a specific pattern in order to enable insertion of the service plug only in a state of the terminal cover being attached. However, it has been expected to prevent the serviceman from forgetting to attach the terminal cover more simply, reliably.

When the power unit is equipped with a plurality of interlock mechanisms or when each of a plurality of power units is equipped with an interlock mechanism, operation of the power units must be controlled without fail in accordance with operating conditions of the interlock mechanisms.

SUMMARY

First, the present invention ensures safety during maintenance operation of a power unit. Second, the present invention provides a safety circuit capable of accurately grasping operating condition when a power unit is equipped with an interlock mechanism.

The present invention is directed toward a power unit made from a plurality of series-connected battery modules, comprising:

a cover for covering positive and negative terminals of the battery modules; and a safety switch that opens and closes a connection among the battery modules by insertion and removal of a service plug which regulates removal of the cover by engaging the cover, wherein a connector that closes the connection among the battery modules in a state of being attached to the cover is projectingly provided on a back of the cover, and the connection among the battery modules is opened and closed by means of insertion and removal of the connector associated with attachment and removal of the cover as well as of insertion and removal of the service plug.

In an embodiment of the present invention, the connection among the battery modules is closed by means of insertion of the service plug and insertion of the connector associated with attachment of the cover.

The present invention is also directed toward a safety circuit having the power unit, the circuit comprising:

a signal transmitter;

a signal detector that receives a signal transmitted from the signal transmitter;

a switch that is provided between the signal transmitter and the signal detector and that is opened and closed by insertion and removal of the connector; and a controller that detects removal of the connector in accordance with the signal received by the signal detector, to thus disconnect the power unit from the load.

In another embodiment of the present invention, according to a value of an electric current detected by the signal detector when an electric current of a given value is supplied from the signal transmitter, the controller identifies a normal state of the connector being inserted, an anomalous state of the connector being removed, and other circuit failures.

According to the present invention, safety can be ensured at the time of maintenance operation. Further, an operating state of an interlock can be grasped accurately.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the present invention will be described hereunder by reference to the drawings.

Figure 1:
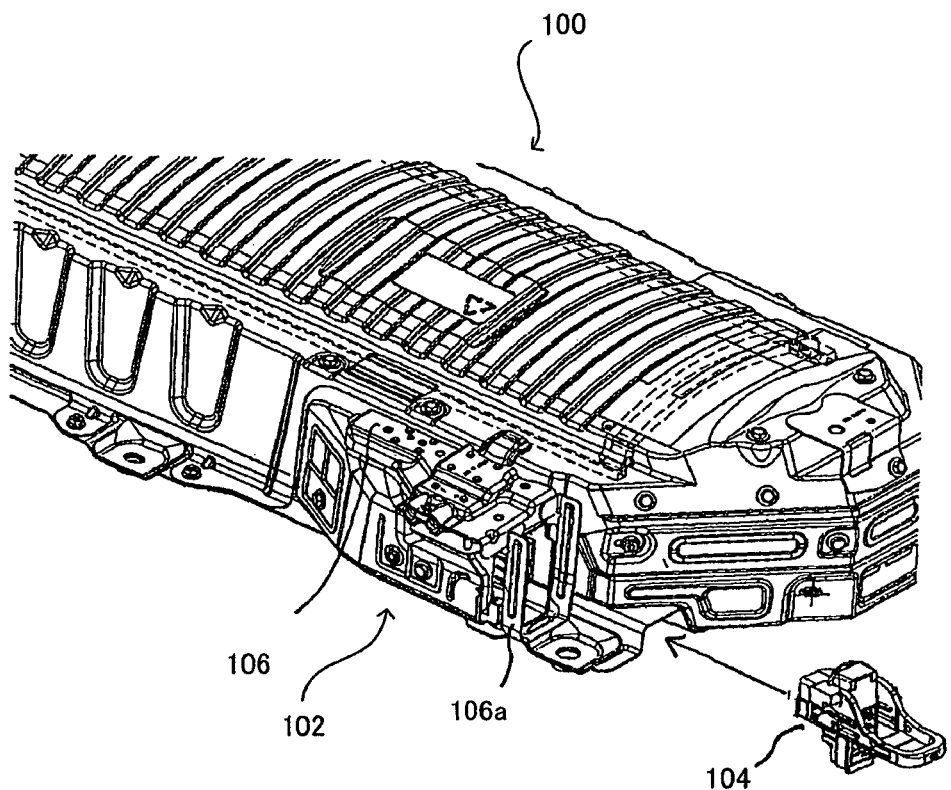
FIG. 1 is an explanatory view of insertion of a service plug (SP) of an embodiment.
Figure 6:
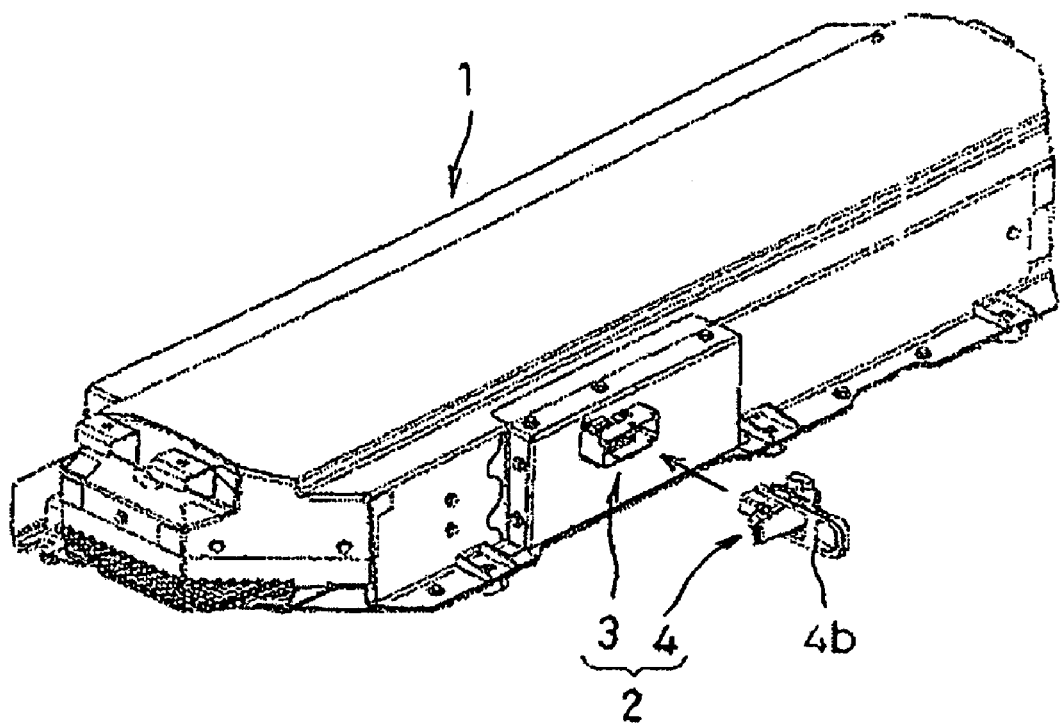
FIG. 6 is a schematic view of a related-art battery pack.
Figure 7A:
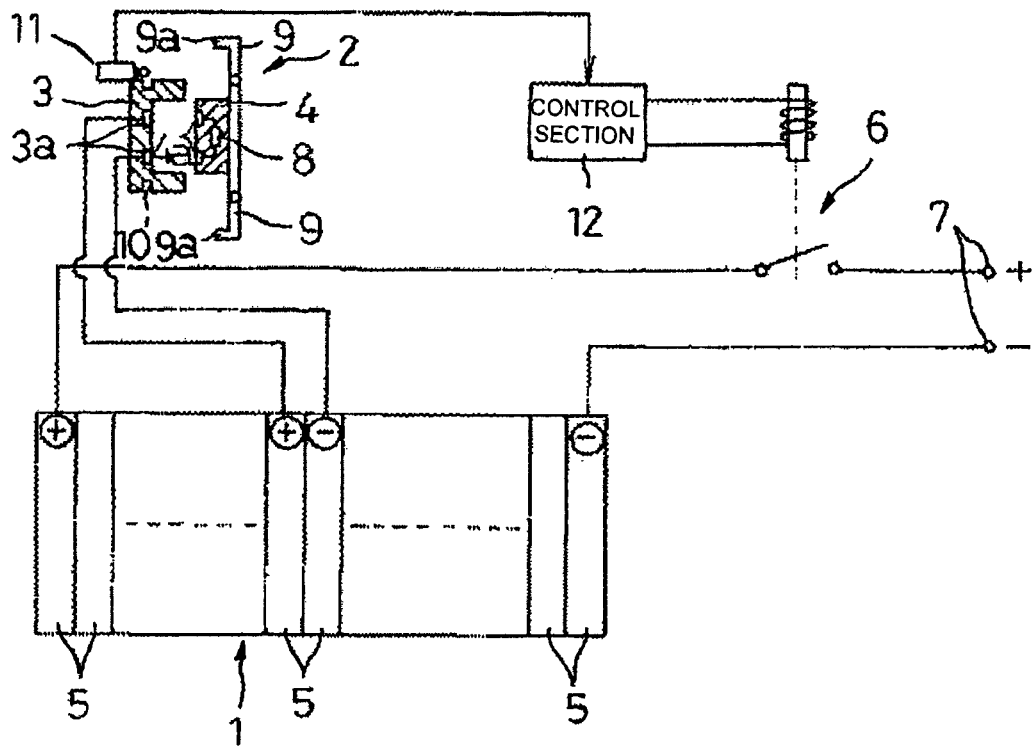
FIGS. 7A and 7B are schematic circuit diagrams of the related-art battery pack.
Figure 7B:
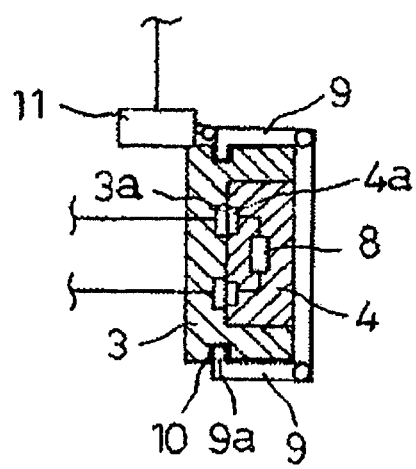

FIG. 1 shows the configuration of a battery pack 100 serving as a power unit of a present embodiment for driving a vehicle. The basic configuration of the battery pack 100 is identical with that of a related-art battery pack shown in FIG. 6. A plurality of battery modules made up of one cell or a plurality of series-connected cells are arranged in parallel with cooling passages interposed therebetween. The battery pack includes a built-in battery assembly constructed by binding and assembling end members disposed at both ends of the battery modules and connecting the battery modules in series with each other. A cooling air ventilation passage for supplying and exhausting a cooling air to and from the respective cooling passages provided between the battery modules is laid in upper and lower portions of the battery assembly. A charge/discharge monitoring section (a battery ECU) where equipment for monitoring a voltage, a current, a temperature, an SOC, and the like, of a battery pack is provided on one side surface of the battery assembly, and a fan for supplying a cooling air to the cooling air ventilation passage is provided on the other end of the battery assembly.

A terminal board 102 having positive and negative external connection terminals for battery modules is provided on one side surface of the battery pack 100. The terminal board 102 has a terminal cover 106 for covering an upper portion of the terminal board, thereby preventing exposure of the external connection terminals. A safety switch for opening and closing a current-carrying circuit located between interconnected arbitrary battery modules is provided in the terminal board 102. The safety switch is made up of a switch main body and a service plug (SP) 104 and configured such that the current-carrying circuit is closed by inserting the service plug 104 into the side of the terminal board 102 as indicated by an arrow and such that the current-carrying circuit is opened by removal of the service plug 104. The safety switch is identical in configuration with; for instance, a related-art safety switch. A pair of connection terminals are connected in parallel within the switch main body of the safety switch, and positive and negative terminals of the pair of battery modules are connected to the connection terminals. A pair of connection terminals are provided opposite the connection terminals on an insertion-side end face of the service plug (SP) 104 of the safety switch. The pair of connection terminals are connected together by way of a fuse, and the connection terminals are connected together by way of the fuse by insertion of the service plug 104 into the switch main body. The current-carrying circuit is shut off by removal of the service plug 104.

Figure 2:
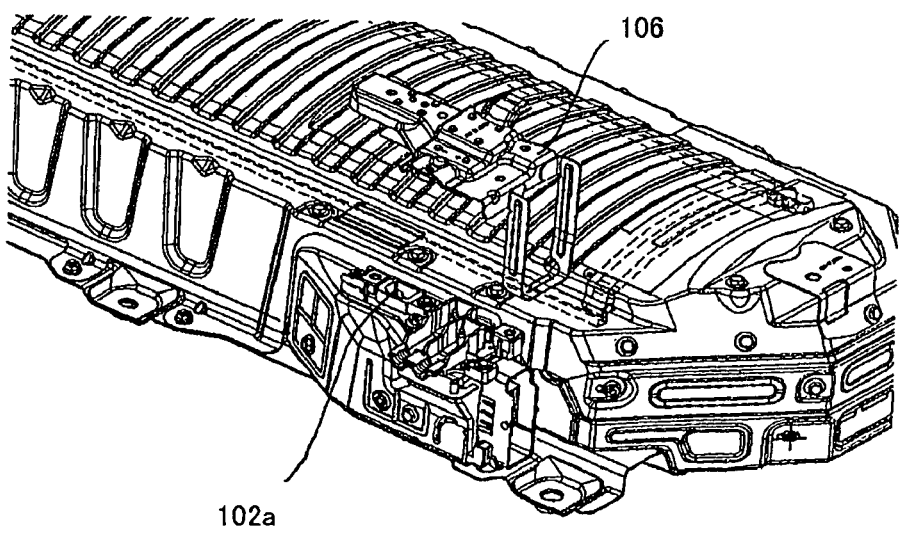
FIG. 2 is an explanatory view of attachment/removal of a terminal cover of the embodiment.

In an inserted state of the service plug (SP) 104, the current-carrying circuit is closed, and the service plug is engaged with an engagement portion 106a of the terminal cover 106, thereby locking the terminal cover 106 and preventing removal of the cover. Specifically, the engagement portion 106a of the terminal cover 106 is situated at the side of the terminal board 102 when covering the upper portion of the terminal board 102, and a protruding portion of the service plug (SP) 104 inserted from the side is fitted into an opening formed in the engagement portion 106a, thereby locking the terminal cover 106. Therefore, in order to remove the terminal cover 106 for performing maintenance and check on the terminal board 102, the service plug (SP) 104 must first be removed. After removal of the service plug (SP) 104, the terminal cover 106 is removed as shown in FIG. 2, to thus perform maintenance and check. The connection between the battery modules is opened as a result of removal of the service plug (SP) 104, to thus interrupt the current-carrying circuit. Hence, the serviceman can perform maintenance and check by removal of the terminal cover 106.

In the meantime, after completion of maintenance operation, the reverse of operation performed for initiating maintenance operation; namely, operation for attaching the terminal cover 16 to the terminal board 102 and subsequently inserting the service plug (SP) 104 into the safety switch from the side of the terminal board 102, is performed. However, there may arise a case where the service plug (SP) 104 is inserted before attachment of the terminal cover 106 to the terminal board 102 or where the serviceman inserts the service plug (SP) 104 by forgetting to attach the terminal cover 106. In this case, the current-carrying circuit is closed by insertion of the service plug (SP) 104 with the terminals exposed outside.

For this reason, in the present embodiment, in addition to the safety switch being provided in the terminal board 102, a second safety switch that opens and closes the current-carrying circuit by attachment and removal of the terminal cover 106 is provided. The second safety switch also has the same configuration as that of the safety switch (that is hereinafter taken as the first safety switch). A pair of connection terminals are connected in parallel in a switch main body, and positive and negative terminals of a pair of battery modules are connected to the connection terminals. Although the first safety switch and the second safety switch are connected in series with each other, the second safety switch opens and closes the current-carrying circuit by engaging not with the service plug (SP) 104 but with a connector provided on the back of the terminal cover 106. The second safety switch is provided in an insertion port 102a of the terminal board 102. When the terminal cover 106 is attached, a connector belonging to the terminal cover 106 is inserted into the insertion port 102a.

Figure 3:
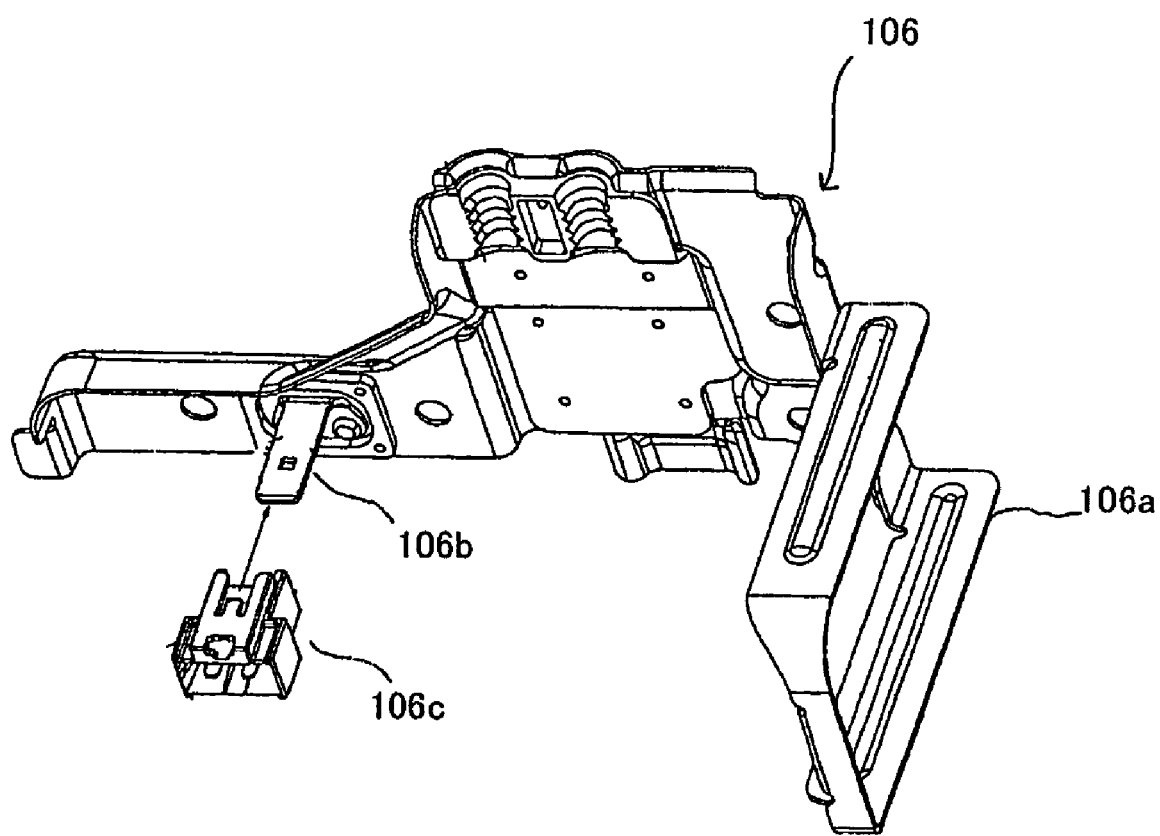
FIG. 3 is a schematic view of a terminal cover.

FIG. 3 shows the configuration of the terminal cover 106. As mentioned previously, the engagement portion 106a is provided at the end of the terminal cover 106. The engagement portion 106a is provided so as to become substantially perpendicular to a main body of the terminal cover 106, and an opening or groove is formed in either side surface of the engagement portion 106a. A projecting portion 106b is provided at a predetermined position on the back of the terminal cover 106 so as to become essentially perpendicular to the main body, and a connector 106c is provided at the extremity of the projecting portion 106b. When the terminal cover 106 is attached to the terminal board 102, the projecting portion 106b is inserted into the insertion port 102a of the terminal board 102, whereupon the connector 106c is connected to the second safety switch. The connector 106c basically functions in the same fashion as does the service plug (SP) 104. As a result of insertion of the connector 106c, the pair of connection terminals provided in the second safety switch are connected together, thereby closing the current-carrying circuit.

Consequently, even when the serviceman inserts the service plug (SP) 104 into the side of the terminal board 102 without attaching the terminal cover 106 after completion of the maintenance operation, the connector 106c of the terminal cover 106 is not inserted into the second safety switch, and hence the battery modules still remain shut off, so that energization, which would otherwise arise while the external terminals are exposed, can be prevented thoroughly.

As above, it is possible to prevent the serviceman from forgetting to attach the terminal cover after completion of operation by providing the terminal board 102 of the battery pack 100 with the first safety switch; providing the second safety switch separately from the first safety switch; controlling the first safety switch by means of insertion or removal of the service plug (SP) 104; and controlling the second safety switch by means of removal or insertion of the terminal cover 106. Further, the battery pack is configured that the terminal cover 106 cannot be removed at the time of initiation of maintenance operation without removal of the service plug (SP) 104, and hence safety is ensured at the time of initiation of maintenance operation.

Figure 4:
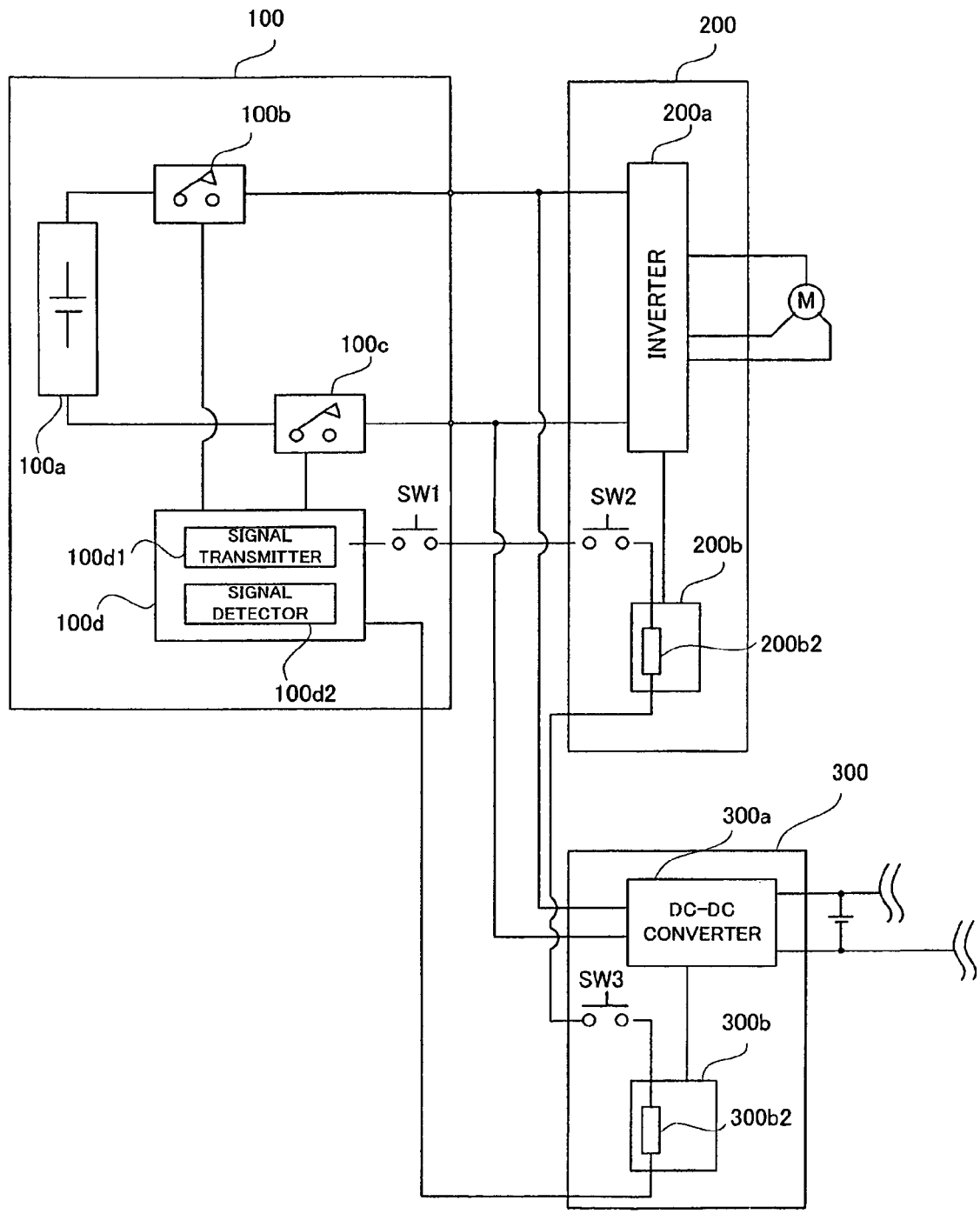
FIG. 4 is an entire circuit diagram of the embodiment.

FIG. 4 shows the entire circuit configuration of a power unit achieved when the power unit is provided on a vehicle. The battery pack 100 is connected to a high voltage device 300 including a DC-DC converter as well as to a high voltage device 200 including an inverter.

The battery pack 100 includes a plurality of battery modules (hereinafter called simply "battery modules") 100a, contactors 100b and 100c, and a controller 100d. The controller 100d further includes a signal transmitter 100d1 and a signal detector 100d2. Positive and negative terminals of the battery modules 100a are connected to an inverter 200a of the high voltage device 200 and a DC-DC converter 300a of the high voltage device 300 by way of the contactors 100b and 100c.

The controller 100d is connected a controller 200b of the high voltage device 200 and a controller 300b of the high voltage device 300 by way of switches SW1, SW2, and SW3. Specifically, the signal transmitter 100d1 of the controller 100d is connected to a signal detector 200b2 in the controller 200b by way of the switches SW1 and SW2. The signal detector 200b2 is connected to a signal detector 300b2 in the controller 300b by way of the switch SW3. The signal detector 300b2 is connected to a signal detector 100d2. Thus, a close circuit separate from the current-carrying circuit that interconnects the battery modules 100a, the inverter 200a, and the DC-DC converter 300a is constituted.

The switches SW1, SW2, and SW3 are switches that operate in synchronism with attachment/removal of respective covers of the battery pack 100, the high voltage device 200, and the high voltage device 300. The switch SW1 corresponds to a connection terminal of the second safety switch that operates in synchronism with attachment/removal of the terminal cover 106 of the battery pack 100. Consequently, when the terminal cover 106 is removed, the switch SW1 remains open, to thus shut off circuitry established among the controllers 100d, 200b, and 300b. The same also applies to the switches SW2 and SW3. When the cover of the high voltage device 200 and the cover of the high voltage device 300 are removed, the switches shut off circuitry.

The controller 100d transmits a signal from the signal transmitter 100d1 and receives the signal by means of the signal detector 100d2. When the terminal cover 106 is removed and when the switch SW1 remains open, the transmission signal is not received. From this event, removal of the terminal cover 106 is detected, and opening of the contactors 100b and 100c is controlled, so that the connection between the battery modules 100a and the inverter 200a or the DC-DC converter 300 can be shut off. The same also applies to the controllers 200 and 300. The switch SW2 is brought into an open state as a result of removal of the cover of the high voltage device 200, and the signal detector 200b2 cannot receive a signal. Hence, operation of the inverter 200a can be stopped. Moreover, the switch SW3 is brought into an open state as a result of removal of the cover of the high voltage device 300, and the signal detector 300b2 cannot receive a signal. Hence, operation of the DC-DC converter 300a can be stopped.

However, when the controller 100d controls opening of the contactors 100b and 100c in accordance with condition of exchange of a signal, to thus disconnect the battery modules 100a from the energization circuit, there arises a necessity for identifying whether the current state is an anomalous state attributable to removal of the cover or the state of a mere circuit failure. For example, identification is performed as follows. Here, the word "circuit failure" signifies a GND shortcircuit of circuitry, a power shortcircuit, a failure in the signal transmitter 100d1, a failure in the signal detector 100d2, and the like.

First, an electric current of given value is supplied from the signal transmitter 100d1. If a normal state is achieved, the signal detector 100d2 detects the current of the given value. In contrast, when there is an anomaly, the signal detector 100d2 cannot detect the current. In the event of a circuit failure, the signal detector detects an anomalous current value. Therefore, identification of a normal state, an anomaly, and a circuit failure can be performed by means of a combination of a transmitted current value (acquired at an OUT side) and a detected current value (acquired at an IN side).

Figure 5:
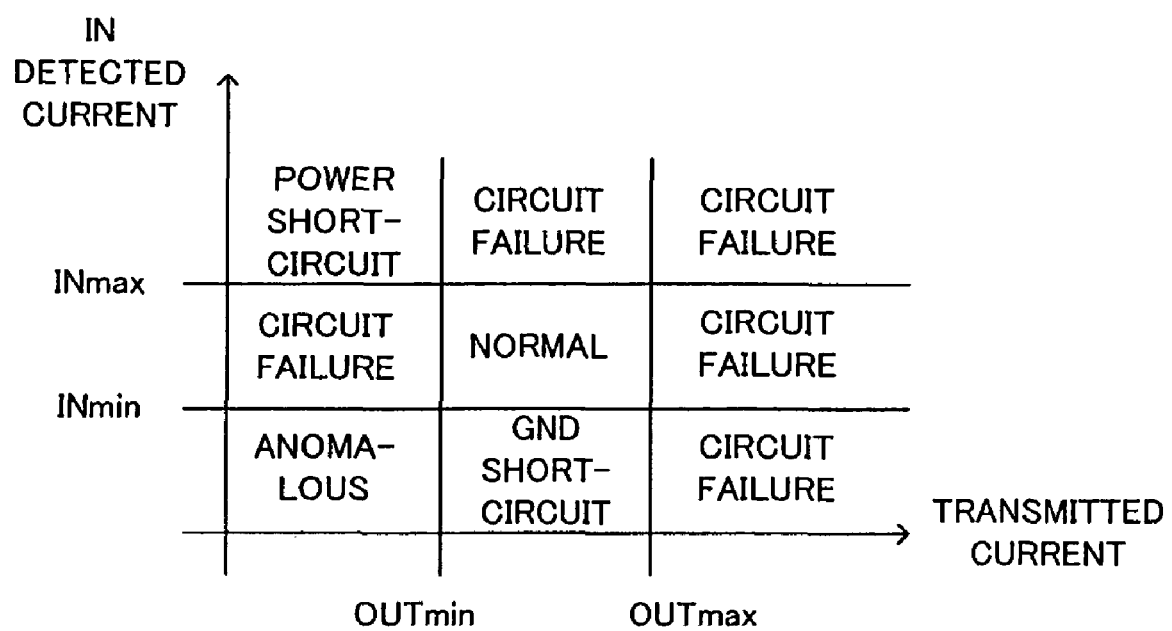
FIG. 5 is an explanatory view of identification of a normal condition, an anomalous condition, and a circuit failure.

FIG. 5 shows an identification map using a transmitted current value and a detected current value. A horizontal axis represents a transmitted current value, and a vertical axis represents a detected current value. A lower limit threshold value OUTmin and an upper limit threshold value OUTmax are set on the transmitted current value, and a lower limit threshold value INmin and an upper limit threshold value INmax are set on the detected current value, as well. Identification is performed according to a relationship between a transmitted current value and the threshold values and a relationship between a detected current value and the threshold values, to thus determine:

(1) Normal State

OUTmin≦a transmitted current value≦OUTmax

And

INmin≦a detected current value≦INmax (2) Anomaly a transmitted current value<OUTmin And a detected current value<INmin (3) Circuit Failure
  (a) GND Shortcircuit OUTmin≦a transmitted current value≦OUTmax And INmin>a detected current value (b) Power Shortcircuit a transmitted current value<OUTmin and a detected current value>INmax (c) Other Circuit Failure
  other relationships.

Identification can also be performed by use of voltage values rather than the current values. When a given voltage is applied from the signal transmitter 100d1, it is better to set a lower limit threshold value Vmin and an upper limit threshold value Vmax and compare detected voltages with the threshold values by means of the respective signal detectors 100d2, 200d2, and 300d2, thereby determining (1) Normal State Vmin≦a detected voltage≦Vmax (2) Anomaly a detected voltage<Vmin (3) Circuit Failure a detected voltage>Vmax.

The threshold values are set for each of the signal detectors 100d2, 200b2, and 300b2.

Even when identification is performed by use of the current values, it is also possible to use a difference $\Delta I$ between a transmitted current value and a detected current value=a transmitted current value−a detected current value. Specifically, given that an error or a sensitivity constant is taken as "e," it is better to perform identification, to thus determine (1) Normal State $|\Delta I| \leq e$ and a transmitted current value>OUTmin (2) Anomaly $|\Delta I| \leq e$ and a transmitted current value<OUTmin (3) Circuit Failure $|\Delta I| > e$: GND shortcircuit or circuit failure and $|\Delta I| < e$: other failure, such as power shortcircuit or circuit failure.

What is claimed is:
1. A power unit made from a plurality of series-connected battery modules, comprising:
  a cover for covering positive and negative terminals of the battery modules; and
  a first safety switch that opens and closes a connection among the battery modules by insertion and removal of a service plug which regulates removal of the cover by engaging the cover, wherein
  the power unit further comprises a second safety switch in which a connector that closes the connection among the battery modules in a state of being attached to the cover is projectingly provided on a back of the cover, and the connection among the battery modules is opened and closed by means of insertion and removal of the connector associated with attachment and removal of the cover as well as of insertion and removal of the service plug, and the second safety switch is formed of a switch main body and the connector, and is configured such that a current-carrying circuit among the battery modules is closed by inserting the connector for engagement, and is opened by removing the connector.

2. The power unit according to claim 1, wherein the connection among the battery modules is closed by means of insertion of the service plug and insertion of the connector associated with attachment of the cover.

3. A safety circuit comprising:

a power unit made from a plurality of series-connected battery modules having a cover for covering positive and negative terminals of the battery modules and a first safety switch that opens and closes a connection among the battery modules by insertion and removal of a service plug which regulates removal of the cover by engaging the cover, wherein the power unit further comprises a second safety switch in which a connector that closes the connection among the battery modules in a state of being attached to the cover is projectingly provided on a back of the cover, and the connection among the battery modules is opened and closed by means of insertion and removal of the connector associated with attachment and removal of the cover as well as of insertion and removal of the service plug, and wherein the second safety switch is formed of a switch main body and the connector, and is configured such that a current-carrying circuit among the battery modules is closed by inserting the connector for engagement, and is opened by removing the connector;

a signal transmitter;

a signal detector that receives a signal transmitted from the signal transmitter;

a switch that is provided between the signal transmitter and the signal detector and that is opened and closed by insertion and removal of the connector; and a controller that detects removal of the connector in accordance with the signal received by the signal detector, to thus disconnect the power unit from a load.

4. The safety circuit according to claim 3, wherein, according to a value of an electric current detected by the signal detector when an electric current of a given value is supplied from the signal transmitter, the controller identifies a state of the connector being inserted, a state of removal of the connector, and other circuit failures.

* * * * *